United States Patent [19]
Gerber et al.

[11] 3,936,712
[45] Feb. 3, 1976

[54] INTERACTIVE GRAPHIC SYSTEM

[75] Inventors: Heinz Joseph Gerber, West Hartford; David J. Logan, Glastonbury; Leonard G. Rich, West Hartford, all of Conn.

[73] Assignee: The Gerber Scientific Instrument Company, South Windsor, Conn.

[22] Filed: July 9, 1973

[21] Appl. No.: 377,769

Related U.S. Application Data

[63] Continuation-in-part of Ser. No. 353,115, April 20, 1973, abandoned.

[52] U.S. Cl. ............... 318/568; 318/576; 318/577; 318/628
[51] Int. Cl. .......................................... G05b 19/42
[58] Field of Search ............ 318/568, 576, 628, 577

[56] References Cited
UNITED STATES PATENTS

| | | | |
|---|---|---|---|
| 3,258,776 | 6/1966 | Boyle et al. | 318/592 X |
| 3,391,392 | 7/1968 | Doyle | 318/568 |
| 3,398,452 | 8/1968 | Little | 318/569 X |
| 3,693,066 | 9/1972 | Friedman et al. | 318/628 X |
| 3,725,760 | 4/1973 | Bailey | 318/568 |
| 3,727,119 | 4/1973 | Stanley et al. | 318/568 |
| 3,750,186 | 7/1973 | Sakamoto | 318/568 X |
| 3,774,098 | 11/1973 | Moss | 318/568 |

*Primary Examiner*—B. Dobeck
*Attorney, Agent, or Firm*—McCormick, Paulding & Huber

[57] ABSTRACT

An interactive graphics system in which plotting, digitizing and other related capabilities are performed is described in which complex graphics may be generated, edited and developed at a plurality of terminals, independently, with a minimum of hardware and in which precision control of the motion of a plotting table at each location is achieved in response to simplified input commands. Additionally, a novel floating cursor is described by which an operator may control the motion of the carriages of a plotting table or other positioning system actuated during plotting on the table, and digitize various coordinate locations with corresponding storage in a central computer of such locations, all by manually positioning the cursor at the desired locations. The floating cursor is connected with an energy sensor and both the cursor and the sensor are mechanically movable relative to or independently of the carriage. An energy generator is fixedly connected to the carriage and is directed toward the sensor so that relative movement of the cursor and carriage can be detected by the sensor. The carriage is then made to move with the cursor in response to signals generated from the energy sensor. Thus, the cursor floats with respect to the carriage, which precisely follows the cursor over a plotting surface and which carriage contains various devices for drafting or other operations on material located on the plotting surface.

38 Claims, 10 Drawing Figures

INTERACTIVE GRAPHIC SYSTEM

CROSS REFERENCE TO RELATED APPLICATIONS

This application is a continuation-in-part of copending application Ser. No. 353,115, filed Apr. 20, 1973, now abandoned, entitled Interactive Graphics System, and having the same assignee.

BACKGROUND OF THE INVENTION

This invention relates to an interactive design or graphics system in conjunction with which a variety of terminal devices may be operated at a plurality of locations to produce precision mechanical, manufacturing or architectural drawings from rough sketches, photogrammetric plans, schematics, printed and integrated circuit artwork masters, and other related graphics.

An interactive graphics system is a system capable of performing some or all of the above functions in which the man-machine interface is utilized to maximize the capabilities of both to produce an end product that, because of the synergistic maximization of capabilities, is in effect superior to that which could be produced either by a computer system alone or by an operator alone. While interactive graphics systems as such are existent in the prior art, a persistent problem has been the complexity of software and hardware required to convert the human input into useful computer data from which graphics can be generated, and in converting the computer output into simplified data from which an operator can derive additional system input, all in a substantially continuous operation.

A problem of the prior art in such systems is in achieving immediate system plotback from data derived from raw material such as rough sketches. In such systems, data must first be digitized, or converted from the sketch to digital coordinate locations and then subjected to various time consuming operations before it can later be plotted as a drawing. In the present system, an operator manually positions a mechanical cursor at selected locations on, for example, a rough sketch. The cursor serves to control the movement of a drafting carriage which "follows" the cursor around the plotting surface and which is electronically controlled by computer commands which in turn are derived in part from the cursor position. Such an arrangement permits an operator, merely by moving the cursor to different locations to digitize for later plotting complex drawings from rough sketches. The system software enables and controls storage, retrieval, carriage positioning and reproduction of all graphic and alphanumeric information by the system under operator control, and incorporates the requisite programs for communicating with a data base and the various peripheral equipment, with software data decoding being used in place of hardware decoding.

In another embodiment of the invention, an electronic cursor generated by a simple mechanical stylus arrangement on the face of a cathode ray tube may be substituted for the mechanical cursor on the plotting table, or used in combination therewith. In prior art systems, sophisticated training is required to operate systems of the prior art, whereas the present system configuration allows relatively untrained personnel to perform graphics operations that formerly required trained specialists.

SUMMARY OF THE INVENTION

An interactive graphics system and a novel cursor therefore is described in which a plurality of graphic design stations under the control of a central computer generate a variety of artwork. At each design station, either a "floating cursor" or an electronically generated cursor is utilized by a station operator to digitize and plot complex data with a minimum of hardware. In the "floating cursor" arrangement, a cursor is mechanically connected to a sensor or detector which is responsive to impinging energy from a source or energy generator mounted on a carriage assembly movable in at least two coordinate directions in a plane generally parallel to the material upon which artwork is to be generated. The cursor is movable mechanically independently of the carriage for maximum operator efficiency, and positioning signals generated in response to the sensor output are utilized to position the carriage, upon which a variety of writing instruments are mounted. The cursor is preferably touch sensitive in order that the system is actuated to enable carriage motion only in response to operator control such that the carriage "follows" the floating cursor and locks into place when the cursor is released. The carriage itself is adapted for motion in the X and Y coordinate directions by a timing belt arrangement controlled by servo motors driven by control signals generated by the local computer in response to information computed from the sensed cursor position. Both position and velocity feedback are derived from resolvers and tachometers which form a portion of the servo system. The control signals are in the form of motor pulses at a frequency proportional to the cursor positional error with respect to the carriage mounted energy source.

In another embodiment of the invention, a mechanical stylus is utilized to position an electronic cursor on the face of a storage cathode ray tube, which enables an operator to control the system operation with a simple movable control.

BRIEF DESCRIPTION OF THE DRAWINGS

Further advantages of the invention will become apparent from the following specification taken in connection with the accompanying drawings wherein like reference characters identify elements of like function throughout the different views thereof, and wherein in several of the views double lines indicate data flow.

DESCRIPTION OF THE PREFERRED EMBODIMENTS

Figure 1:
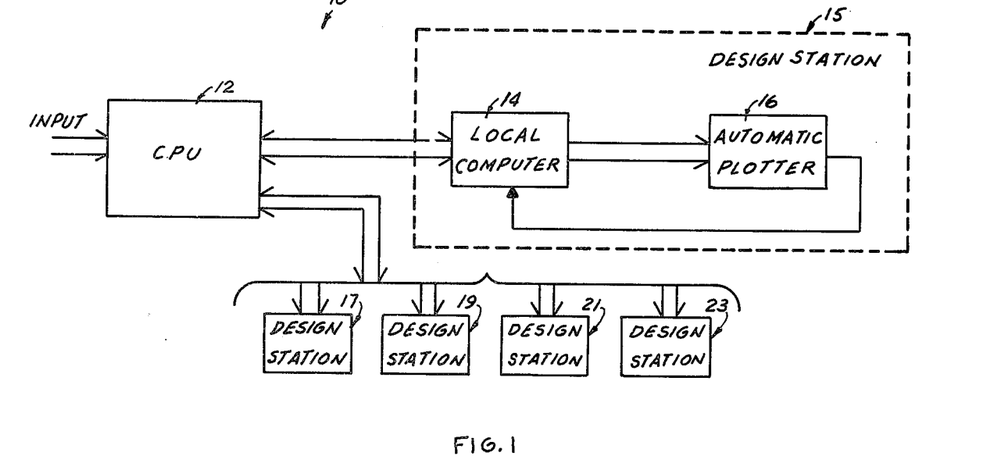
FIG. 1 is a simplified block diagram of an interactive graphics system embodying the present invention.

Referring now to FIG. 1, an interactive graphics system in accordance with principles of the present invention is illustrated generally at 10. A central processing unit 12 controls a plurality of local computers each of which is located at a separate design station. A typical design station 15 includes the local computer such as local computer 14 and its associated input/output devices and an automatic plotter 16, which includes a plotting table having a surface upon which precision drawing and digitizing occurs under the control of the local computer. The automatic plotter 16 additionally generates further sequences of data which are fed back into the local computer 14 and which, in combination with the data received from the central processing unit 12 is utilized to generate digitized position information and precision drafting at the design station. Other design stations 17 through 23 function in similar manner as design station 15, and may include various arrangements of automatic plotters alone or in combination with visual display terminal devices such as cathode ray tubes and alphanumeric displays. The number of other design stations is variable, to permit system expansion and the number of such stations illustrated is exemplary only.

Figure 2:
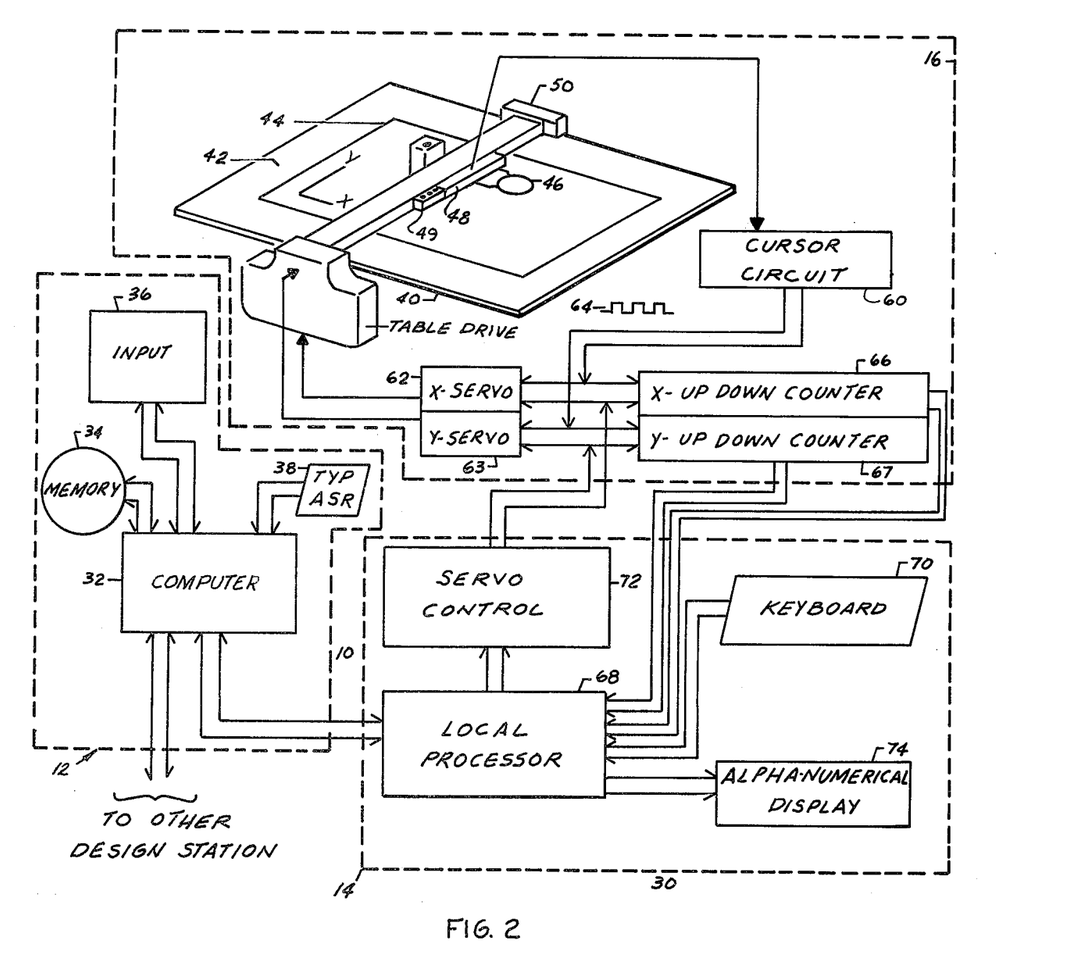
FIG. 2 is a block diagram of an interactive graphics system in accordance with the present invention.

Referring now to FIG. 2, a more detailed block diagram of the central processor 12 and a design station is illustrated generally at 30. The CPU 12 stores and processes a variety of graphic software related to mechanical design, schematic preparation, cartography, printed circuitry, integrated circuit maskmaking and other technologies. The basic component of the CPU may for example, comprise a minicomputer 32 which may be a Hewlett-Packard model 2100 computer with 8,000 words of core expanded to 12,000 words. Additional memory capacity is provided by a disk storage 34, which may illustratively comprise a Hewlett-Packard model 7900 disk with 2.4 million words of storage. System users programs and system requirements are inputted to the CPU via a magnetic tape input device 36 of known design, such as is manufactured by Tri-Data Corp., with additional programming input being provided by an ASR typewriter 38.

An operator at the automatic plotter 16 positions a cursor 46, which may be touch sensitive, magnetic, photoelectric, or of other design, and which is not rigidly mechanically connected to but floatingly suspended from a carriage 48 movable in at least two coordinate directions over a plotting or digitizing surface 42 of a precision plotting table 40, which is a portion of the automatic plotter 16. The illustrated plotting table 40 with its upwardly facing supporting surface 42 has positioned on said supporting surface a workpiece 44 which may be a drawing or other given artwork. Illustratively, cursor 46 is positioned by the operator over selected locations on the workpiece and the carriage 48 is controlled to follow the cursor. In the course of positioning, the operator digitizes, or converts the coordinate locations over which the cursor is positioned into digital information, which is then processed by the local computer 14, transmitted to the CPU and stored on disc memory 34 from which it can be recalled, resent to the local computer and then used to position a writing device mounted on the carriage 48 on the workpiece to produce precision drawings thereon.

The carriage 48 from which the cursor 46 is suspended is supported by a carriage 50 which straddles the table 40 and which is driven for movement relative thereto in the illustrated X-axis coordinate direction. Motion of the carriage 50 in the X-axis coordinate direction is accomplished by timing belts having teeth which intermesh with the carriage gearing. Of course, other drive systems may be utilized, such as the carriage positioning mechanisms which appear in U.S. Pat. Nos. 3,293,651 and 3,330,182; both of which patents are assigned to the assignee of the present invention.

The cursor 46 and the carriage 48 are in turn movable relative to the carriage 50 in the illustrated Y-axis coordinate direction and are driven in said Y-axis coordinate direction by their own timing belts and their associated drive motors. Since the carriage 50 moves relative to the table 40 in the X-axis coordinate direction in response to X-axis controller command signals it is referred to as the X-axis carriage and since the carriage 48 moves relative to the X-axis carriage 50 in response to Y-axis command signals, it is referred to as the Y-axis carriage.

Of course, the writing device carried on the carriage 48 may comprise a wet ink pen, a pencil, or a photoexposure device for projecting a spot of light onto the workpiece 44 for exposing lines and images thereon when the workpiece is a photosensitive material. The above-referenced U.S. Pat. No. 3,330,182 describes such a photoexposure system in detail. For illustrative purposes, the writing device on the carriage 48 is shown as a three pen writing head 49 in which writing occurs by means of any of the pens when such pen is selected by its associated control.

The system arrangement allows sketches to be digitized and edited by the operator with plotback of the drawing on the sketch or another workpiece 44. Thus original drawing layouts are composed directly from such sketches.

The cursor 46, in selecting points for digitizing, has push button controls associated therewith. These push buttons are shown by way of example in FIG. 8 as a LOCATE button 450 for digitizing or recording the coordinate location of certain isolated points, LINE START button 452 for digitizing the beginning of a new line, and LINE END button 454 for digitizing all intermediate points and the last point of a line.

There are a variety of means for deriving the control signals that control the servo motors which position the X- and Y-axis carriages. These signals may drive a step motor such that each pulse steps the motor a predefined increment which moves the carriage a corresponding increment. An alternative control mechanism is a velocity servo mechanism which may be coupled to the carriages and which receives control signals directly as they are generated.

A further alternative method of driving the carriages is by developing motor pulses and utilizing these pulses to drive a pair of servo mechanisms including position and velocity feedback resolvers and tachometers which are coupled one to the X-axis carriage and the other to the Y-axis carriage via appropriate gearing. Such a drive system is generally described herein with respect to the present invention, however the details of such a digital control mechanism are thoroughly set forth in U.S. Pat. application Ser. No. 169,263 of Leonard Rich, filed Aug. 5, 1971 and assigned to the assignee of the present invention.

In digitizing or editing graphic information on a workpiece, coordinate positional data in both X and Y coordinate axes is derived by manually positioning the cursor over the desired location on the workpiece 44 and then pressing the appropriate push button described above on the cursor. The cursor 46 is suspended from the Y-axis carriage 48 for limited manual movement relative to the carriage. This relative movement is detected by a sensor connected with the cursor and described in greater detail below with respect to FIGS. 3, 4 and 8. The sensor output is electrically coupled to a pulse forming circuit 60 which develops the X and Y-axes trains of motor pulses which drive X and Y-axis servo mechanisms 62 and 63 coupled respectively to the X-axis carriage 50 and to the Y-axis carriage 48 and causes the carriage to follow the cursor. The motor pulses 64 are also supplied to X and Y UP/-DOWN position counters or meters 66 and 67 which provide digitally the instanteous absolute table coordinate location of the cursor along the X and Y-axes respectively. When the appropriate digitizing push button is pressed, this location data is fed to the local processor 68 of the local computer 14 and is processed together with other commands from a function keyboard 70 of conventional design.

For subsequent plotting the processed positional data is then coupled to a servomotor control 72 which couples position error correction signals digitally to the X and Y-axes servo mechanisms 62 and 63 respectively and to the X and Y-axes UP/DOWN position counters 66 and 67 respectively, thereby providing carriage motion in the X and Y-axes corresponding to the processed positional data immediately upon generation of such data. An alphanumeric display 74, which may consist of a digital readout device provides a system operator with a visual indication of the data received by processor 68. Thus, two digital control loops are present for each axis, one for digitizing, processing and plotting and one for controlling carriage positioning in response to cursor movement. Of course, it is readily apparent that many servo components may be shared by the two control loops. In an alternate embodiment of the apparatus the motor pulses from the cursor circuit 60 may be fed only to the counters 66 and 67 and the servo control 72 in the local computer 14 may condition all servo command signals for the X and Y-axes carriages during both the plotting of processed data and the slaving of the carriages to the cursor movements.

Since local processor 68 is accessable both via keyboard 70 and CPU 12, a variety of functions may be performed at each design station and devices other than those illustrated may be utilized, such as drum plotters and photoplotters, either on-line or off-line.

Figure 3:
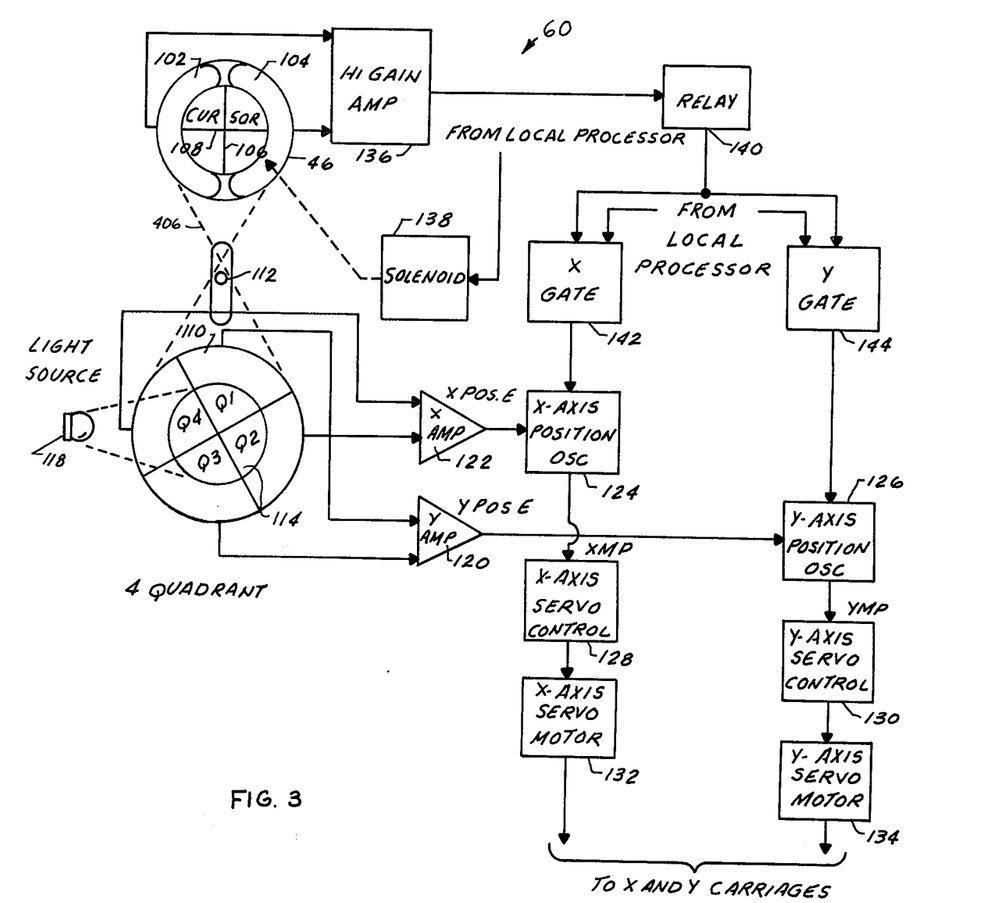
FIG. 3 is a block diagram of a cursor control system incorporating floating cursor in accordance with the present invention.

Referring now to FIG. 3, a block diagram of the cursor 46 and its associated circuitry 60 is generally illustrated. The cursor 46 is illustrated as a touch sensitive device which requires a resistive connection between halves 102 and 104 to complete an electrical circuit, which connection is provided by the fingers of an operator when grasping the cursor by hand; other cursor designs of like function may be provided without departing from the present invention, and the cursor 46 and its associated four quadrant sensor 110 are described by way of example only. Of course, the halves 102 and 104 of the touch sensitive cursor could alternatively be capacitively coupled, rather than resistively coupled, by the operator's hand to activate the circuit 60.

The cursor 46 is preferably of a plastic material with wires therein leading to the high gain amplifier 136 and forming an incomplete electrical circuit which is completed when grasped by an operator as described above. A reticle comprised of fine lines 106 and 108 attached to the cursor is movable to a desired location on the plotting and digitizing surface 44. The four quadrant sensor 110 is mechanically connected to the cursor 46 via a common mount taking the form of a tongue plate 406 illustrated schematically in FIG. 3 and shown in detail in FIG. 8. As described below, the tongue plate is suspended from the Y-axis carriage 48 by a floating pivot pin 112 to permit limited movement of the cursor and sensor relative to the carriage in the X and Y coordinate directions. When the cursor 46 is moved in the Y coordinate direction, signals from the sensor 110 cause the entire Y-axis carriage 48 to move therewith, and when the cursor is moved in the X coordinate direction, sensor signals cause the entire X-axis carriage 50 with the Y-axis carriage 48 mounted thereon to move therewith. When the cursor is moved at an angle to both axes, both the X-axis carriage and Y-axis carriage move simultaneously therewith. All of the carriage movements are executed under motor control and with minimum frictional drag.

Figure 4:
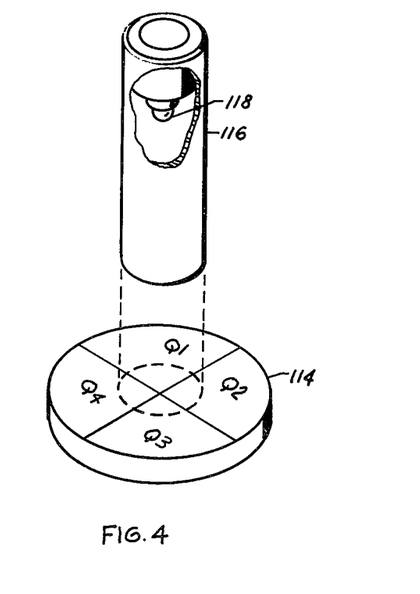
FIG. 4 is a simplified isometric view of a four quadrant detector as employed in the present invention.

The four guadrant sensor 110 also shown in detail in FIG. 4 is a photosensor mounted beneath a light source 118 fixed in the Y-axis carriage 48. Generally, it is divided into four electrically isolated areas or quadrants $Q_1$, $Q_2$, $Q_3$ and $Q_4$, each of which senses the light impinging thereon to develop electrical signals in response thereto. As the light source moves with respect to the four sensing quadrants, or conversely, as the quadrants move with respect to the source, the light impinging on those quadrants varies in either greater or lesser degree, hence the electrical signals generated from the photoelectric conversion also vary in corresponding greater or lesser degree. These signals are compared with each other to develop resultant X-axis and Y-axis error signals indicative of the motion of the sensor 110 with respect to the light source 118. Since the sensor moves mechanically with the cursor 46, the instantanous cursor position is sensed. The motion of the cursor and the sensor is mechanically independent of the X and Y-axis carriages. The term mechanically independent is intended to mean that the cursor and sensor may be physically moved without carriage motion because there is no rigid connection therebetween. Of course, the resultant control signals produced by the sensor motion move the X and Y-axes carriages electronically.

A typical sensor 110 is a silicon p-n solar energy converter of the type manufactured by Sensor Technology, Inc. Model No. ST-300 modified to provide four quadrant detection.

FIG. 4 illustrates generally the photosensitive portion 114 of the photosensor. A hollow tube with the light source 118 mounted therein casts light as illustrated by the dotted lines on each of the four quadrants as shown. When the photosensitive portion 114 moves with respect to the impinging light, certain quadrants receive more or less illumination than other quadrants.

The electrical outputs of quadrants $Q_1$ and $Q_3$ are coupled to a Y-axis differential amplifier 120 in FIG. 3 to derive a velocity command signal proportional to the Y-axis positional error and the outputs of quadrants $Q_2$ and $Q_4$ are coupled to an X-axis differential amplifier 122 to derive a corresponding velocity command signal proportional to the X-axis positional error.

The X and Y-axes position errors control X and Y-axes position oscillators 124 and 126 respectively, each of which contains a voltage controlled oscillator (VCO) with a linear frequency response directly proportional to its respective input signal. Thus, the greater the incoming position error, the higher the VCO output frequency becomes. The VCO output frequencies are used to generate the X and Y-axes motor pulses which are received by the digital circuitry of the respective X and Y-axes servo controls 128 and 130 respectively which together witth the servomotors 132 and 134 form the X and Y-axes servomechanisms 62 and 63 in FIG. 2. The outputs from the X-axis servo control 128 and the Y-axis servo control 130 drive X and Y-axes servo motors 132 and 134 respectively, the details of which are set forth in the aforementioned patent application Ser. No. 169,263, and which servo motors drive the X and Y-axes carriages via their respective timing belts as aforementioned.

When the cursor 46 is not held by an operator, the circuit to the high gain amplifier 136 is open and the X and Y-carriages are automatically locked in place at whatever position they may happen to be in, as a safety feature for the operator. A relay actuated solenoid 138 lifts the cursor 46 slightly from the plotting surface in response to a signal from the local computer when plotting is enabled.

When the cursor is grasped by the operator to close the amplifier circuitry, the amplified signal from amplifier signal from amplifier 136 actuates a relay 140, which acts as the enabling switch for the voltage controlled oscillators for both X and Y-axes position control. X and Y-axes gates 142 and 144 respectively couple the enabling signal to their respective VCO's biasing them on and ready to generate their respective signals at a frequency proportional to the incoming error signals.

Figure 5:
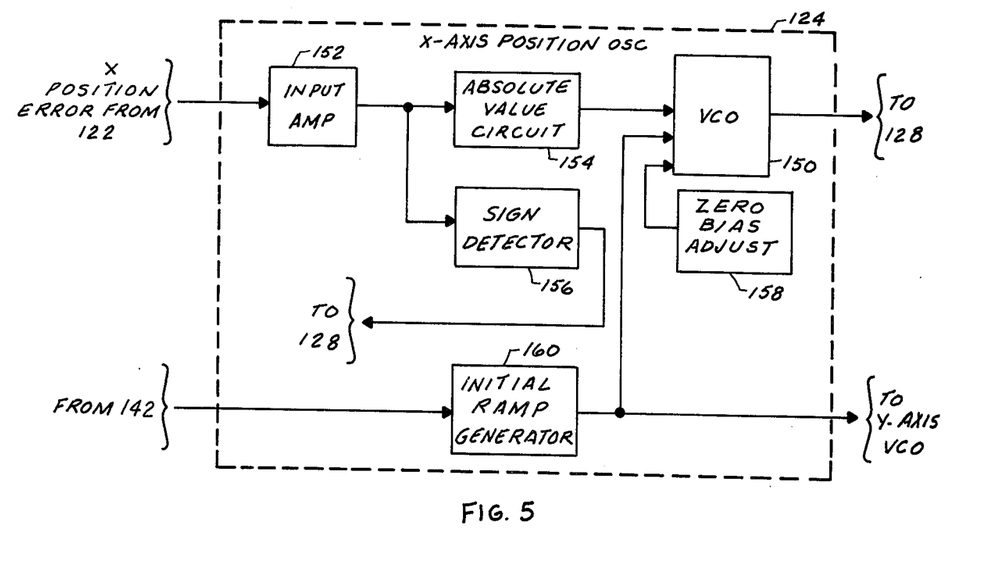
FIG. 5 is a block diagram of certain circuitry which is employed in the present invention.

Referring now to FIG. 5, a block diagram of the X-axis position oscillator 124 is illustrated. The Y-axis position oscillator 126 is substantially identical, hence it is not illustrated, and the X-axis position oscillator description is equally applicable thereto.

The heart of the X-axis position oscillator 124 is a VCO 150 which, as previously mentioned, has a linear frequency variation with input error voltage characteristic. The X position error voltage output of differential amplifier 122 is fed to an input amplifier 152 which performs an impedance matching function by adjusting the input gain for various cursors which might be utilized with the system. The amplified input position voltage is coupled to an absolute value circuit 154 and to a sign detector 156. Absolute value circuit 156 converts its bidirectional input to an unidirectional output to provide an absolute magnitude input voltage control signal for the VCO 150, which is required in order that the VCO frequency is always proportional to the magnitude of the positional error. The direction of motion of the servomotor 128 is controlled via the output of the sign detector 156 which causes the servomotor to rotate either forward or backward. The VCO 150 is of conventional design, and preferably consists of a silicon controlled rectifier (SCR) fired by discharging a unijunction transistor into an integrating amplifier. A biasing circuit 158 biases the VCO control voltage at zero volts when no input error exists. An initial ramp generator 160 provides a startup ramp which provides initial damping to maintain the VCO off until a signal is received from amplifier 136 which is indicative of the cursor being touched by an operator. The output of ramp generator 160 is also coupled to the Y-axis VCO.

Figure 6:
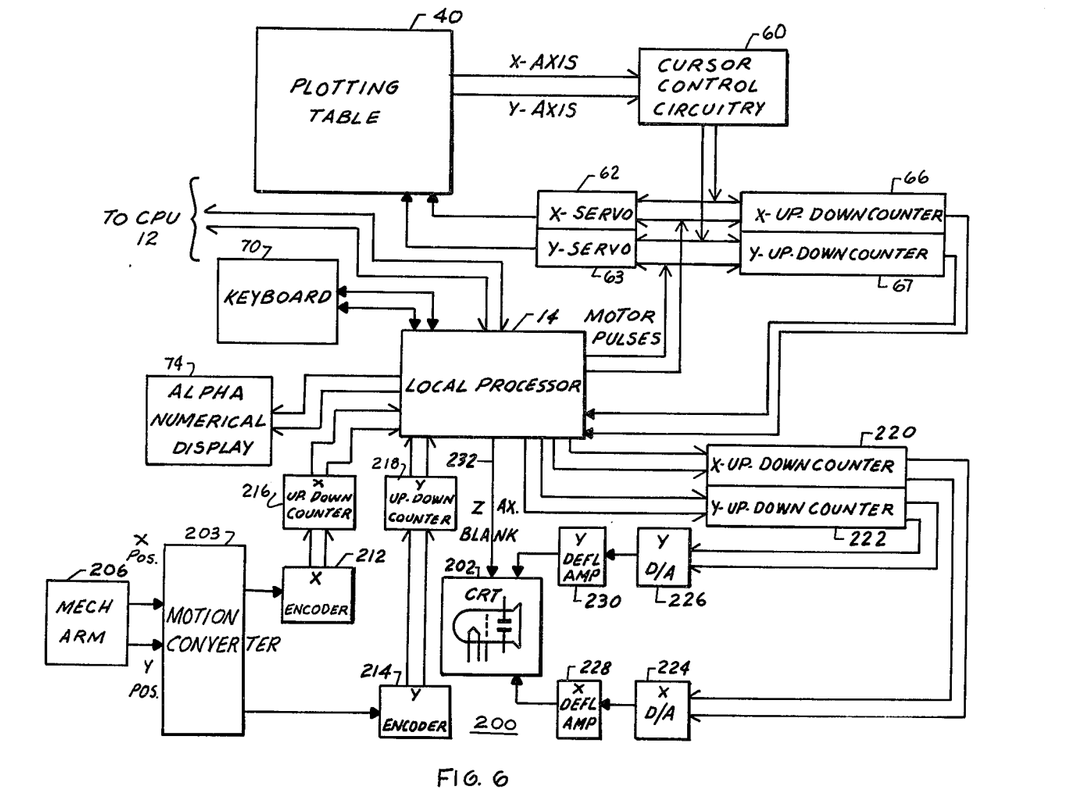
FIG. 6 is a block diagram of an interactive graphic system in accordance with the present invention.

Referring now to FIG. 6, a block diagram of an interactive graphics system incorporating a cathode ray tube with a mechanical stylus for cursor positioning is illustrated generally at 200. This system is the same as that described in FIG. 2, but with the added CRT 202 which, because of its storage and drawing speed capability, permits artwork generation, editing and composition to be initiated at the CRT station.

Communication between the CPU 12 and local processor 14 is by a predetermined software routine and program format which enables a full range of keyboard functions present in keyboard 70, which keyboard is of conventional construction. The software is not described in detail herein in order that simplicity of description may be maintained, however, it is sufficient for an understanding of the invention that the software is a high level dynamic language which is implemented by standard programming techniques.

Figure 9:
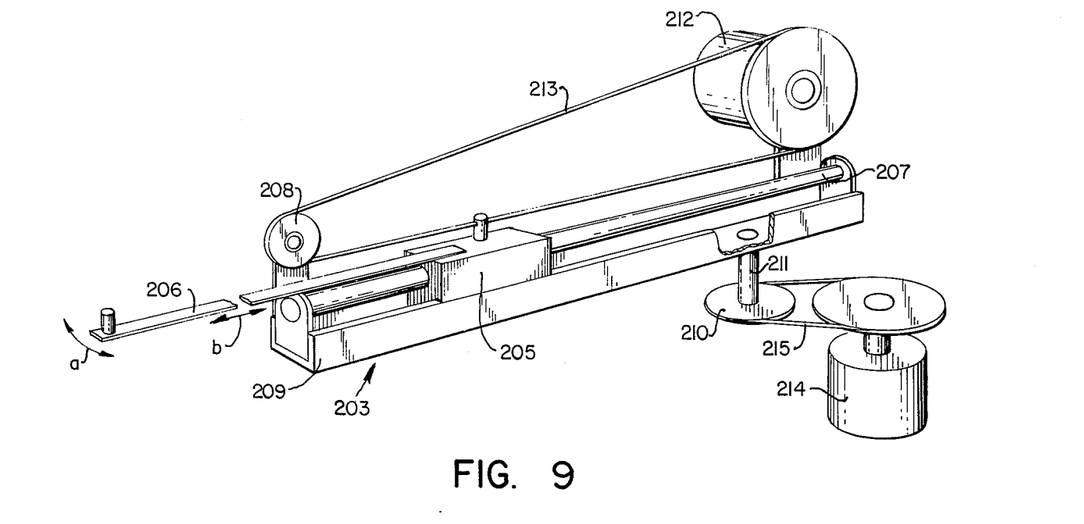
FIG. 9 is a perspective view of a mechanical stylus utilized in one embodiment of the present invention.

A stylus in the form of a mechanical arm 206 shown in detail in FIG. 9 is mounted at any convenient location on or near the CRT 202 and is movable by an operator to control the positioning of an electronic cursor or light spot resulting from the deflected electron beam on the screen of the CRT 202. The mechanical arm 206 is supported on a pivotal slide assembly 203 which includes a slide block 205 connected to the arm 206, a slide rod 207 holding the block and a pivotal base plate 209 supporting the arm 206 and the slide rod 207 for swivelling motion on a shaft 211 rigidly connected to the plate 209. The assembly 203 enables the arm 206 to be moved from side to side as indicated by the arrow *a* to control the positioning of the cursor or spot on the CRT screen in the X-coordinate direction and also enables the arm to be moved in and out as indicated by the arrow *b* to control the positioning of the cursor in the Y coordinate direction.

The motions of mechanical arm 206 are converted to X and Y-axes positional data as follows. A pulley 208 and cable 213 connected to the slide block 205 transmit the in-and-out or rectilinear motion of the arm 206 to the rotary input shaft of an X-axis encoder 212. Another pulley 210 fixedly mounted on the shaft 211 and a cable 215 transmit the curvilinear or side-to-side motion of the arm and slide assembly to the rotary input shaft of an Y-axis encoder 214. Each of the encoders has the same construction and may be of the type manufactured by Dynamic Research Corporation, Massachusetts, Model 77-40-B01 which convert the rotary position of an internally mounted optical disc, each of which optical discs is fixedly mounted on one of said shafts, into digital pulse trains. These pulse trains are fed to up/down counters 216, 218 in FIG. 6 for each axis and thence to the local processor 14 wherein, under the control of the system software routine, corresponding X and Y-axes pulses are output to X and Y-axes up-down counters 220 and 222 which supply positional data to a pair of digital-to-analog converters 224 and 226 for the respective X and Y-axes deflection signals for the horizontal and vertical deflection coils of the CRT 202, which analog deflection signals are developed in well known manner by X and Y-axes deflection amplifiers 228 and 230. Thus, the mechanically coupled stylus 206 enables an operator to precisely position an electronic cursor on the CRT screen in accordance with various commands and other lines and symbols generated by the keyboard 70 and coupled to the local processor 14. The Z-axis beam turn-on and turn-off is provided by a blanking signal from the processor 14 via line 232.

Cursor position data can be transmitted by local processor 14 to the CPU 12 and stored then later retransmitted to local processor for plotter control via X and Y-servos 62 and 63.

Figure 7A:
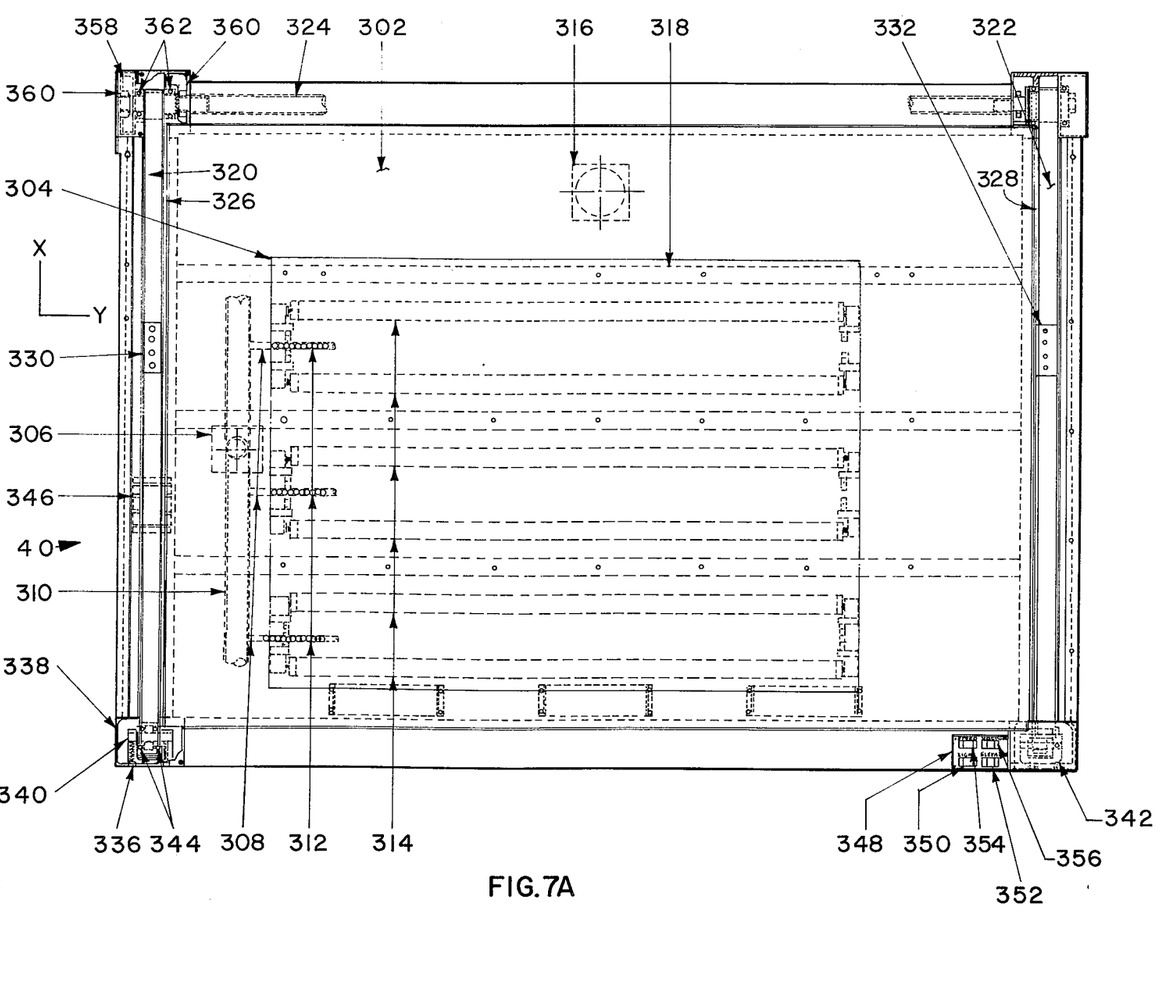
FIG. 7A is a plan view of a plotting table of the type utilized in the present invention.
Figure 7B:
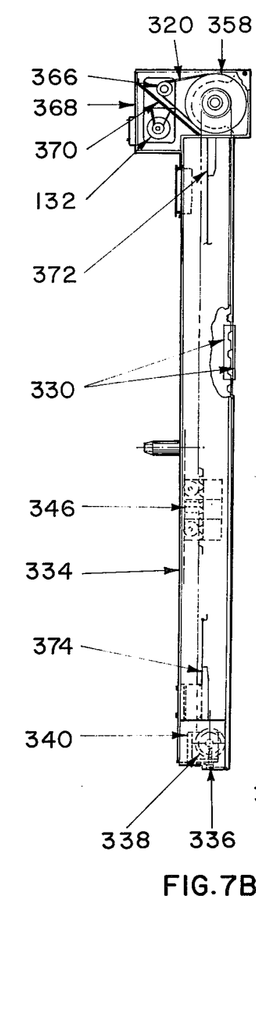
FIG. 7B is a side elevation view of the plotting table of FIG. 7A.

Referring now to FIGS. 7A and 7B, a plan view of the automatic plotting table 40 is illustrated in detail together with a side elevation view thereof. The platen assembly is comprised of two sheets of translucent material such as Plexiglas sandwiched together and illustrated at 302. The surface upon which drawing occurs is outlined by line 304. Drawing material, either paper or mylar or other material suitable for drawing thereon, is positioned on the platen surface within the area defined by line 304 and is held firmly in place by a vacuum holddown which creates a suction force on the drawing material. A vacuum input port 306 is cut through the lower Plexiglas sheet and a plurality of conduits 308 between the Plexiglas sheets serve to conduct the vacuum throughout the entire region beneath the drawing material, all of which conduits 308 are connected to the vacuum input port 306 via main conduit 310. A plurality of holes 312, in the upper Plexiglas sheet directly above the conduits 308 exposes the bottom side of the drawing material to the vacuum. Backlighting of the drawing is provided by a plurality of parallel lamps 314 which are mounted beneath the Plexiglas and a cooling fan 316 is ducted to a plurality of internal louvres 318 to provide cooling in order that any heat created by lamps 314 is dissipated.

Two precision timing belts 320 and 322, which are movable in the X-axis direction are coupled together by a torque tube 324 which is of sufficient stiffness to drive the timing belts in unison. The X-axis carriage 50 in FIG. 1 is not illustrated in FIGS. 7A and 7B but would be mounted on a track assembly 326 and 328 for motion in the X-direction, as indicated, relative thereto. The X-axis carriage is also connected to the timing belts 320 and 322 by screw button holding sockets 330 and 332 so as to move along the track assembly 326 and 328 in response to motion of the timing belts. The timing belts 320 and 322 are precision tensioned so that motion along a predetermined number of teeth thereon produces the same reproducible increment of motion each time the belts are moved. The entire timing belt, track and platen assembly is supported by a rigid backplate 334. The timing belts are tension adjustable to maintain accuracy by means of a screw assembly 336 which fastens into a yoke 338 in which yoke is also mounted a stud 340 for a take up pulley 342 which is an idler and rotates on its own bearings 344. The Y-axis carriage, driven by its own timing belts, rides on the X-axis carriage.

The X-axis carriage is counterbalanced by a counterbalance sub-assembly 346 which weighs approximately as much as the X-axis carriage and which is fastened to the opposite side of timing belts 320 and 322 which drive the X-axis carriage. The counterbalance 346 serves to stabilize the X-axis carriage in its movement, particularly when the table is tilted at an angle to the horizontal. An electrical panel 348 contains the switch 350 which operates the backlighting, switch 352 which serves to tilt the table switch 354 which regulates the carriage speed and switch 356 which operates the vacuum.

The torque tube 324 is driven by a drive pulley 358 and rests in a collar 360 with a ball bearing assembly 362. The X-axis servomotor 132 with an associated resolver 366 for developing the position feedback signals powers the drive pulley 358, all of which is mounted in a pulley housing 368 with a shield strip 370 therein for safety. Microswitch trips 372 and 374 serve to shut off the X-axis carriage power in the event that the carriage moves too close to the table edges.

The table assembly as a whole provides a highly accurate positioning means for automatically moving the carriage mounted thereon to any desired location on the table.

Figure 8:
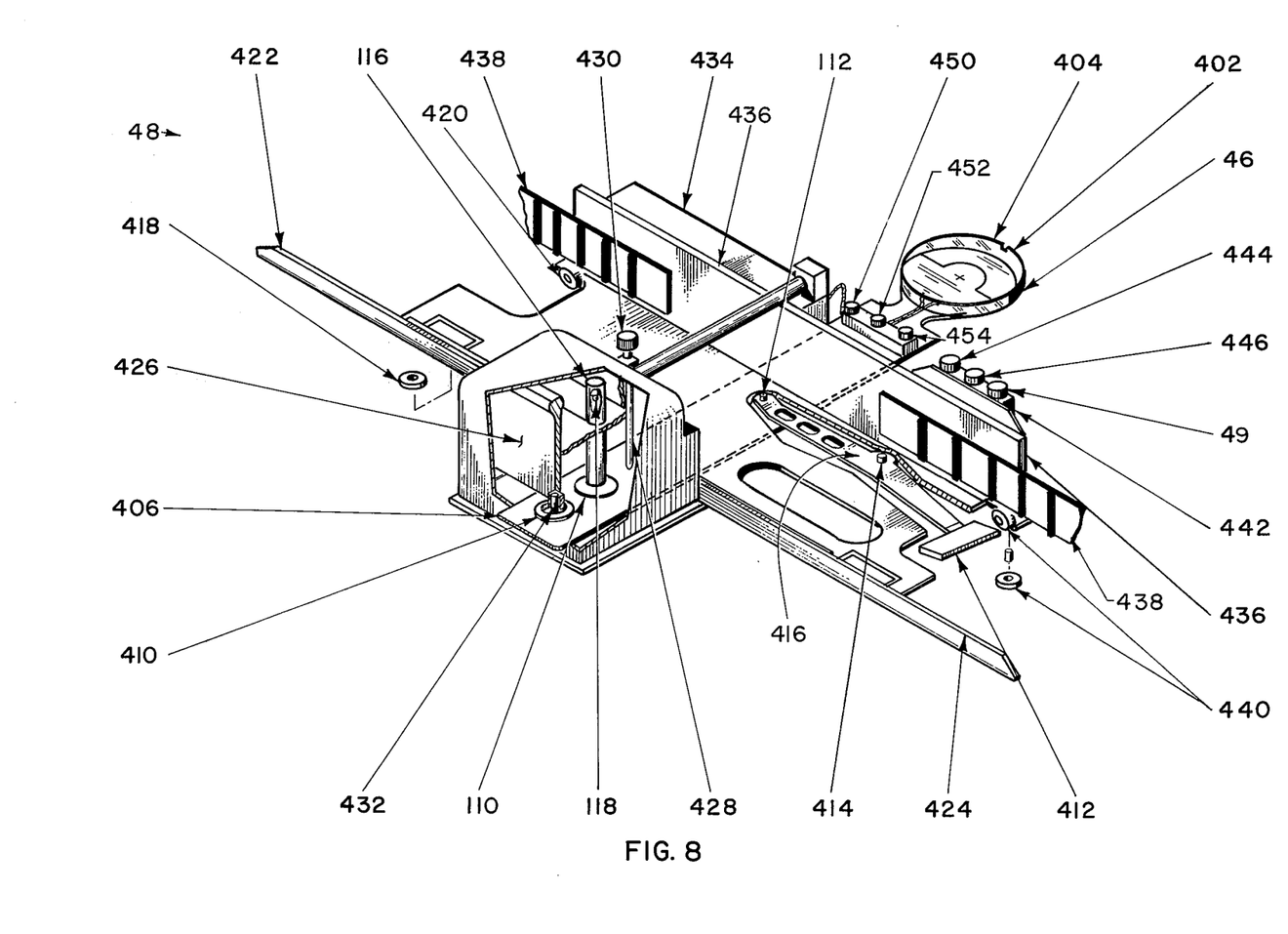
FIG. 8 is an isometric view of the Y-axis carriage assembly and cursor structure of the present invention.

Referring now to FIG. 8, the Y-axis carriage assembly 48 including the four-quadrant photosensor 110 and cursor 46 is illustrated isometrically and partially cut away. The cursor 46, including touch sensitive wires 402 and 404 which complete the electrical circuit previously described with reference to FIG. 3, is mounted on a tongue plate 406 on which the photosensor 110 is also mounted. The tongue plate 406 is supported from the carriage 48 by means of a counter balance assembly 412 to permit pivoting movements about the pins 112 and 414. Such pivoting movements correspond substantially to limited movements of the cursor 46 relative to the carriages 48 in the X and Y coordinate directions respectively. The relative movements produce corresponding movements of the sensor 110 relative to the light source 118 and enable displacement error signals to be generated as described above for slaving the carriage 48 and 50 to the cursor 46 and for digitizing selected points located with the cursor.

A rubber washer 410 fixed to the tongue plate 406 and engaged by a pin 432 fixed to the carriage 48 inhibits motion of the tongue plate 406 which might otherwise remove the photo-sensor 110 entirely from the light emanating from the light source 118, which could otherwise occur in the event that the cursor were to be moved at a speed faster than the system servo response time. The washer 410 serves to allow the carriage to "catch up" to the cursor in such event, without loss of continuity of operation of the system. The counterbalance assembly 412 is pivotally connected at pin 414 to the tongue plate 406 via balance beam or arm 416 for the purpose of counterbalancing the cursor and tongue plate when the table is in other than a horizontal position. This prevents the cursor 46 from moving due to gravity and adds to the overall system accuracy. The framework of the carriage assembly 48 provides overall support and is clamped to the timing belt 438. Additional carriage support is provided by a hook weldment assembly 422 and a poker arm 424. The lamp housing 116 is mounted inside structural support 426 holding the pin 432 and an insulator electrically isolates the sensor 110 from its surrounding structural support. The amount of friction clamping or drag of the cursor and its associated tongue plate 406 relative to the carriage 48 is controllable by means of a friction pin 428 with a nylon tip which is adjustable by means of a set screw 430. Contact with rubber washer 410 is made by pin 432 to prevent unwanted cursor motion relative to the light source 118 as previously described. Electrical components are housed in a panel assembly 434 and bearing assemblies 418 and 420 abut an underlying steel plate upon which is the track on the X-carriage upon which the entire Y-carriage rides. The timing belt 438 is clamped to a supporting surface 436 and passes around external pulleys on the X-carriage 50. Additional bearing assembly 440 provides rolling support for the remainder of the Y-carriage on the underlying steel plate. The three pen holder 449 with writing pens 442, 444 and 446 mounted therein rides laterally of the cursor tongue assembly as previously described.

While particular embodiments of the invention have been shown and described, various modifications thereof will be apparent to those skilled in the art and therefore it is not intended that the invention be limited to the disclosed embodiments or to details thereof and departures may be made therefrom within the spirit and scope of the invention as defined in the appended claims.

We claim:

1. A computer controlled plotting system in which lines and symbols are automatically drawn on a drawing material in response to control signals, which drawing material resides upon a supporting surface of said plotting system, including a carriage assembly movable generally in a plane over said drawing material, said carriage assembly being capable of motion in two generally orthogonal coordinate directions in said plane and at least one writing instrument mounted on said carriage assembly for writing on said drawing material when said carriage is moved in response to said control signals, the improvement comprising: a cursor manually positionable over said drawing material for indicating the coordinate location of said cursor with respect to said supporting surface, said cursor being operably connected to said carriage assembly such that motion of said cursor with respect to said supporting surface generates said control signals which cause said carriage to move in response thereto, said cursor being mechanically suspended from said carriage assembly and having limited freedom of movement in the two coordinate directions relative to the carriage assembly and the support surface of the plotting system.

2. A plotting system in accordance with claim 1 wherein said cursor comprises a reticle rigidly mechanically connected to a sensing element which senses electromagnetic energy emanating from a source mounted on said carriage such that motion of said sensing element in a plane generally perpendicular to said source causes an error signal to be generated, said error signal being coupled to a carriage positioning means which moves said carriage in response thereto.

3. A plotting system in accordance with claim 2 in which said carriage positioning means includes a servomechanism responsive to said error signal.

4. A plotting system in accordance with claim 3 wherein said carriage assembly includes a first carriage movable over said supporting surface in one of said orthogonal coordinate directions and a second carriage mounted on said first carriage and movable thereon in the other of said orthogonal coordinate directions.

5. A plotting system in accordance with claim 4 wherein said writing instrument and said electromagnetic energy source are mounted on said second carriage and are movable therewith.

6. A plotting system in accordance with claim 2 wherein said sensing element is a photodetector which converts light energy to electrical energy, and wherein said source is a light source.

7. A plotting system in accordance with claim 6 wherein said photodetector includes means for sensing the light energy impinging upon four quadrants thereof and for generating four electrical signals, each of which electrical signals being in response to said light energy in one of said quadrants, and means for comparing said electrical signals such that two positional error signals are generated, each of which positional error signals is indicative of cursor position in one of said mutually orthogonal coordinate directions.

8. A plotting system in accordance with claim 7 further comprising: means responsive to said two positional error signals for converting said error signals into trains of motor pulses, and servomechanism means for controlling the motion of said carriage assembly in said two orthogonal coordinate directions in response to said motor pulses.

9. A plotting system in accordance with claim 8 wherein said means responsive to said positional error signals includes a pair of voltage controlled oscillators, the frequencies of which are dependent upon said positional error signals, with said frequencies further being directly related to the frequencies of said motor pulses, one of which voltage controlled oscillator frequencies is related to the frequency of said motor pulses in one of said orthogonal coordinate directions and the other of which voltage controlled oscillator frequencies is related to the frequency of said motor pulses in the other of said orthogonal coordinate directions.

10. A plotting system in accordance with claim 5, further including means responsive to the output of said sensing element for generating a pair of error signals, each of which error signals is indicative of cursor position in one orthogonal axis.

11. A plotting system in accordance with claim 10 further comprising means associated with each of said orthogonal axes, each of which means is responsive to one of said error signals for generating motor control signals; and motors associated with each of said carriages for controlling the motion thereof in response to said motor control signals.

12. A plotting system in accordance with claim 10 wherein said cursor position is stored in said computer.

13. A plotting system in accordance with claim 11 wherein said cursor includes a touch sensitive circuit actuatable upon the physical touching of said cursor, and gating means actuatable by said touch sensitive circuit for enabling said system.

14. A plotting system in accordance with claim 13 wherein said touch sensitive circuit is completed by the resistance of the hand of an operator upon touching said cursor.

15. A plotting system in accordance with claim 13 further including solenoid means for raising said cursor from said drawing material a predetermined distance when plotting.

16. A plotting system in accordance with claim 5 further comprising vacuum holddown means operably associated with said supporting surface for holding said drawing material in close contact therewith.

17. A plotting system in accordance with claim 5 wherein said supporting surface includes a substantially translucent material upon which said drawing material resides and further comprising illumination means mounted behind the opposite surface of said translucent material to which said drawing material resides for illuminating said drawing material.

18. A computer controlled positioning system in which a carriage assembly is automatically positioned to predetermined coordinate locations in a plane generally parallel to a surface in response to control signals from said computer and wherein said carriage assembly includes a tool mounted thereon for working on material positioned on said surface as said carriage assembly moves with respect to said material, the improvement comprising: a cursor manually positionable with respect to said coordinate locations, said cursor being operably connected to said carriage assembly such that motion of said cursor with respect to said surface generates control signals which cause said carriage to move in response thereto, said cursor being mechanically suspended from said carriage assembly and manually movable by limited amounts relative to the carriage assembly to coordinate locations on the material positioned on said surface.

19. A positioning system in accordance with claim 18 further including energy sensing means mechanically connected to said cursor and energy generating means mounted on said carriage assembly to which said energy sensing means is responsive such that motion of said energy sensing means with respect to said energy generating means is detected and converted into electrical signals; and means for utilizing said electrical signals for controlling the motion of said carriage assembly.

20. A computer controlled graphics system comprising:
a plotting table for drawing lines and symbols on drawing material mounted on the support surface of the table in response to positioning signals generated by a servomechanism having two coordinate axes extending parallel with the table surface;
a stylus movable in at least two coordinate directions associated respectively with coordinate axes of the servomechanism;
motion conversion means for converting the motion of said stylus into electrical signals;
electronic cursor generation means controlled by said electrical signals for generating a cursor, the location of which with respect to a reference grid is stored by said computer, the reference grid having coordinate axes corresponding respectively with the axes of the servomechanism and the coordinate directions of the stylus, and
counter means, the input of which is coupled to said computer for receiving said stored cursor locations, and the output of which is coupled to said servomechanism for controlling the generation of said positioning signals.

21. A computer controlled graphics system in accordance with claim 20 wherein said electronic cursor generation means comprises a storage cathode ray tube, having a visual display area associated therewith, upon which visual display area said reference grid is located, and wherein said electronic cursor comprises a light spot movable over said visual display area, said light spot being generated by the electron beam of said storage cathode ray tube.

22. A computer controlled graphic system in accordance with claim 20 wherein said positioning signals are generated by a stepping motor.

23. A computer controlled graphics system in accordance with claim 21 wherein said plotting table includes:
a first carriage movable in one coordinate direction a second carriage movably mounted on said first carriage for motion in a coordinate direction orthogonal to said first mentioned orthogonal direction;
a writing assembly mounted on said second carriage including at least one writing instrument, and
motor pulse generation means for generating motor pulses in response to the output of said counter means,
means for controlling said servomechanism in response to said motor pulses,
and means for coupling said positioning signals to said first and second carriages for controlling the motion of said first and second carriages in said orthogonal coordinate directions.

24. A plotting system in accordance with claim 23 further including a cursor positionable over said drawing material for digitizing the coordinate location of said cursor on said material, and means controlled by said electronic cursor for positioning said cursor over said drawing material.

25. A digitizing cursor apparatus for use with an automatic plotting system including:
an energy generation means rigidly mounted to a carriage movable in a first plane;
an energy detector having four energy sensitive quadrants responsive to the output of said energy generation means and movably mounted in a second plane, substantially parallel to said first plane;
a reticle rigidly connected to said energy detector and movable therewith in said second plane;
means connected with the detector for converting the detected energy into an electrical signal indicative of the quantum of energy impinging upon the quadrants of said energy detector; and
means for utilizing said electrical signal to control the motion of said carriage such that said energy generation means is generally centered above the quadrants of said energy detector.

26. A digitizing cursor apparatus in accordance with claim 25 wherein said means for utilizing comprises:
means for converting said electrical signal into a digital control signal; and
a servomechanism controlled by said digital control signal operably connected to said carriage for moving said carriage in said first plane.

27. A digitizing cursor apparatus in accordance with claim 26 wherein said carriage is movable in two coordinate directions in said first plane.

28. A digitizing cursor apparatus in accordance with claim 27 wherein said means for converting is coupled with a counter, and means for storing the contents of said counter.

29. In a device having a support table and a carriage translatable by means of a servomotor over a supporting surface defined by the table, the improvement comprising:
a manually engaged cursor suspended from the carriage for limited freedom of movement relative to the carriage parallel to the supporting surface of the table and having means for signalling manual engagement of the cursor:
sensing means for detecting the relative movement of the cursor and carriage and producing error signals indicative of the relative movement;
servomotor control means connected with the sensing means and the servomotor and responsive to the error signals for driving the servomotor and causing the carriage to follow the cursor over the supporting surface of the table; and gating means interposed between the sensing means and the servomotor control means and being connected with and responsive to the means for signalling for activating the servomotor control means when the cursor is manually engaged.

30. In a device having the support table and carriage, the improvement of claim 29 wherein the sensing means is mounted on the carriage together with the suspended cursor.

31. In a device having the support table and carriage, the improvement of claim 30 wherein the sensing means comprises a photosensor mounted for movement with the cursor relative to the carriage.

32. The improvement of claim 30 wherein: the sensing means is a four quadrant photosensor; and a light source is also mounted on the carriage for illuminating selected areas of the photosensor in accordance with the cursor movements.

33. The improvement of claim 29 wherein means including a counterbalance are provided for suspending the cursor from the carriage in a balanced condition.

34. The improvement of claim 33 wherein the means including the counterbalance includes a tongue plate on which the cursor is mounted and a balance beam pivotally connected to both the carriage and the tongue plate.

35. The improvement of claim 34 further including a damping member extending between the carriage and the tongue plate.

36. The improvement of claim 34 wherein the sensing means is also mounted on the tongue plate.

37. The improvement of claim 29 further including
  a meter connected with the servometer control means for measuring the absolute location of the cursor over the supporting surface of the table; and
  data recording means connected with the meter for recording selected locations of the cursor over the supporting surface.

38. The improvement of claim 37 further including a control buttom mounted on the cursor and connected with the data recording means for entering from the meter selected locations of the cursor in the date recording means.

* * * * *